United States Patent
Deo et al.

(10) Patent No.: US 6,547,150 B1
(45) Date of Patent: Apr. 15, 2003

(54) SMART CARD APPLICATION DEVELOPMENT SYSTEM AND METHOD

(75) Inventors: Vinay Deo, Redmond, WA (US); David Milstein, Redmond, WA (US); Eric C. Perlin, Seattle, WA (US); Gilad Odinak, Bellevue, WA (US); Scott B. Guthery, Newton, MA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/552,550

(22) Filed: Apr. 19, 2000

Related U.S. Application Data

(60) Provisional application No. 60/133,447, filed on May 11, 1999.

(51) Int. Cl.$^7$ ................................................ G06K 19/06
(52) U.S. Cl. ..................... 235/492; 235/380; 235/375; 235/379; 235/487
(58) Field of Search ................................. 235/492, 380, 235/375, 382, 379, 487

(56) References Cited

U.S. PATENT DOCUMENTS

| | | | |
|---|---|---|---|
| 5,615,331 A | 3/1997 | Toorians et al. | 395/182.07 |
| 5,630,049 A | 5/1997 | Cardozia et al. | 395/183.01 |
| 5,710,884 A | * 1/1998 | Dedrick | 345/866 |
| 5,923,884 A | * 7/1999 | Peyret et al. | 235/382 |
| 6,004,049 A | * 12/1999 | Knox | 400/472 |
| 6,005,942 A | * 12/1999 | Chan et al. | 235/379 |
| 6,101,607 A | * 8/2000 | Bachand et al. | 709/328 |
| 6,148,083 A | 11/2000 | Fieres et al. | 380/255 |
| 6,296,191 B1 | * 10/2001 | Hamann et al. | 235/487 |

FOREIGN PATENT DOCUMENTS

| | | |
|---|---|---|
| EP | 0 190 733 A2 | 8/1986 |
| EP | 0 292 248 | 11/1988 |
| EP | 0 356 237 | 2/1990 |
| EP | 0 466 969 A1 | 1/1992 |
| EP | 0 949 595 A2 | 10/1999 |
| FR | 2 667 419 | 10/1990 |
| WO | WO 92/13322 | 8/1992 |
| WO | WO 98/09257 | 3/1998 |
| WO | WO 98/19237 | 5/1998 |
| WO | WO 98/25239 | 6/1998 |
| WO | WO 98/40818 | 9/1998 |
| WO | WO 98/43212 | 10/1998 |
| WO | WO 98/52160 | 11/1998 |

\* cited by examiner

Primary Examiner—Michael G. Lee
Assistant Examiner—Steven S. Paik
(74) Attorney, Agent, or Firm—Lee & Hayes, PLLC

(57) ABSTRACT

An application development system for smart cards includes a computer system having a client development interface (CDI), a smart card having a smart card development interface (SCDI) and application program interface (API) functionality within the smart card operating system. The SCDI interfaces remote procedure calls from the CDI, thereby allowing API functionality to be called upon within the smart card operating system. In operation, the SCDI receives remote procedure calls (RPC) from the computer system and selectively invokes APIs associated with smart card operating system, thereby enabling the smart card to carry out specific functional tasks.

32 Claims, 7 Drawing Sheets

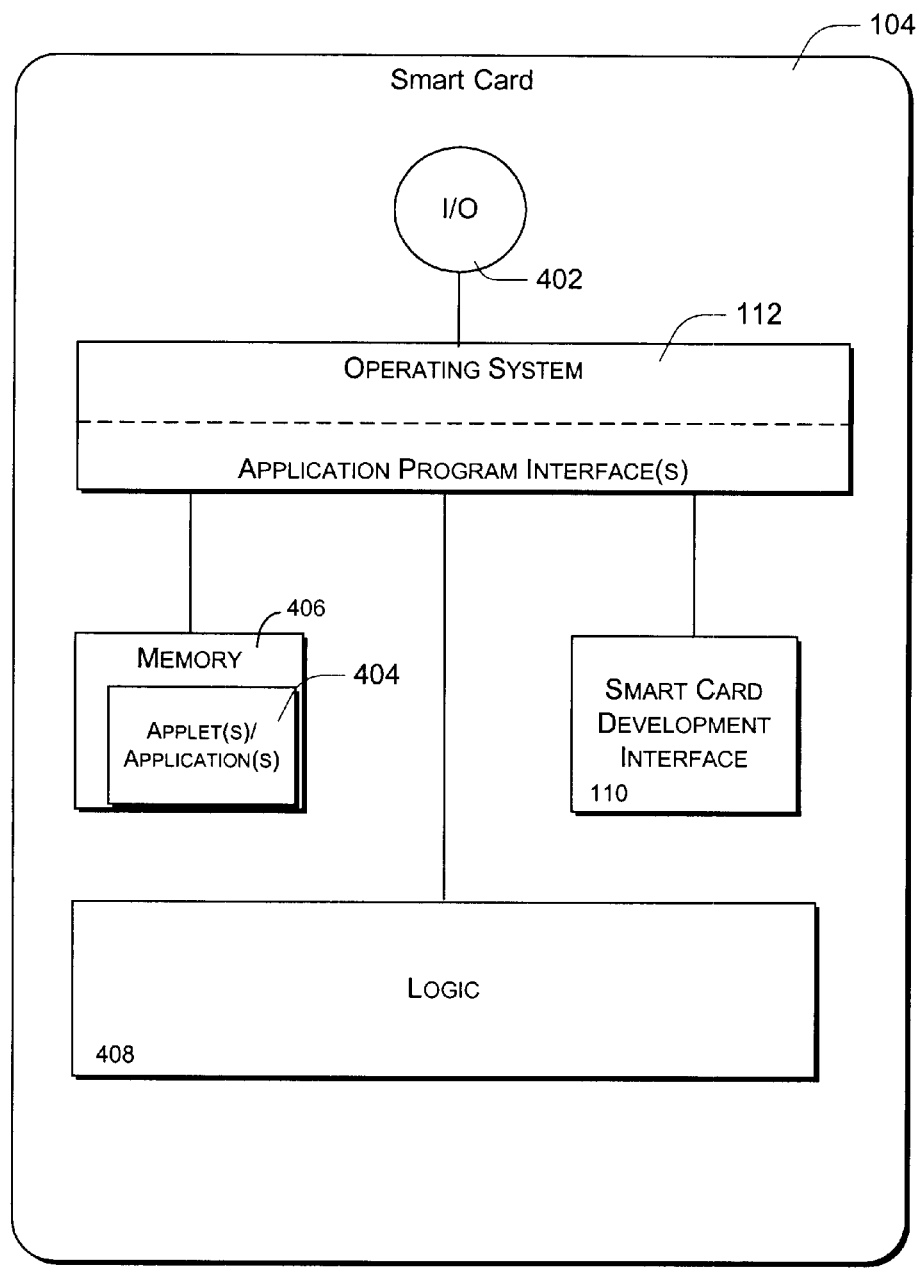

Fig. 6

| RPC Call | API Function | Size | Parameters | Type | Response |
|---|---|---|---|---|---|
| ScwIsAuthenticated | 10 | 8 | 2 | String | Yes |

| CLA | INS | P1 | P2 | Lc |
|---|---|---|---|---|
| hex | hex API Num(h) | | | |
| 00 | 00 | 02 | 06 | 11 |

704

| Data | | | |
|---|---|---|---|
| # of Params | ParamType | Size | Param | ... |
| 1 | 's' | 8 | "xyz" | |

306

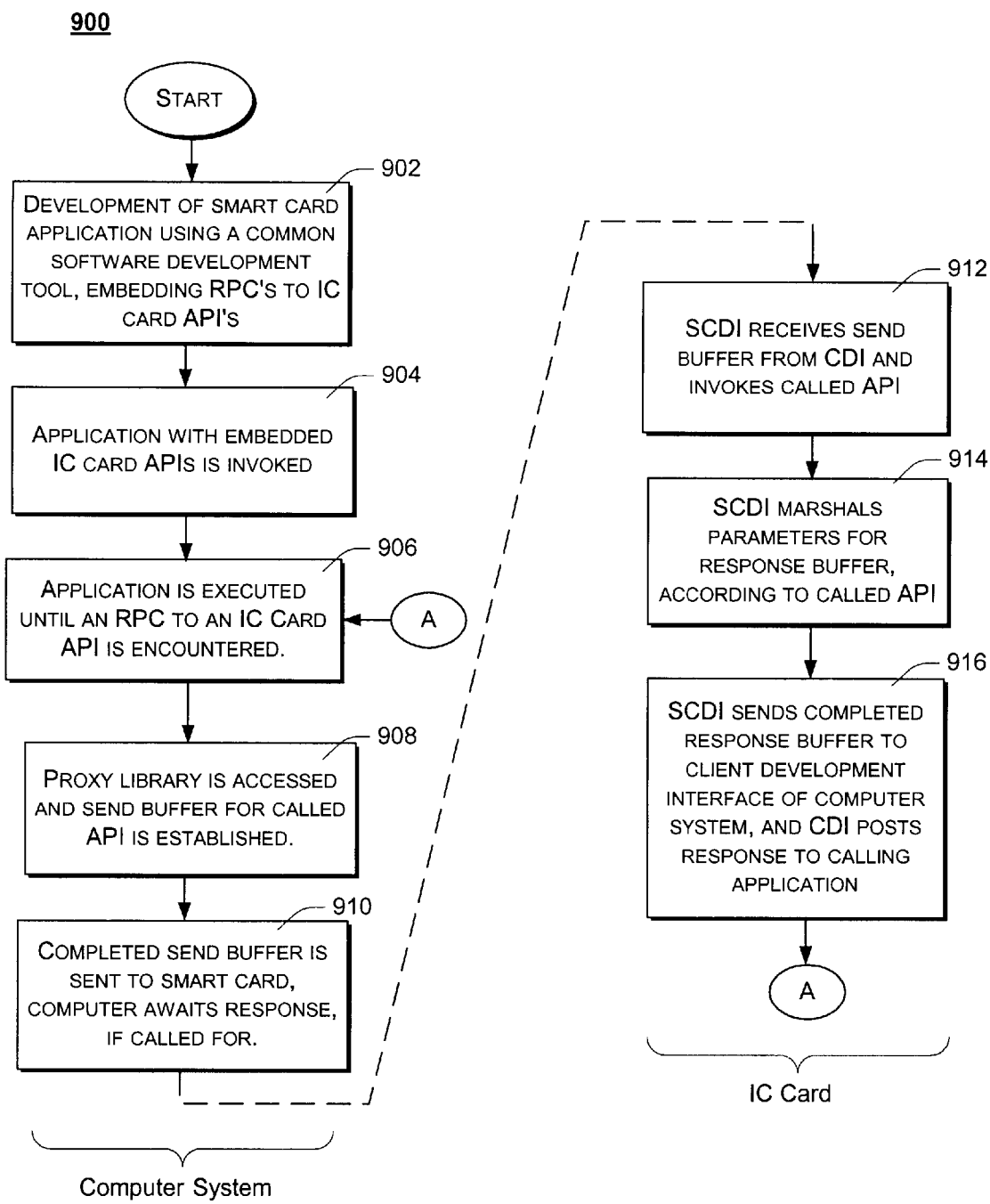

SMART CARD APPLICATION DEVELOPMENT SYSTEM AND METHOD

PRIORITY INFORMATION

This application expressly claims the benefit of the filing date established with U.S. Provisional Application No. 60/133,447 filed May 11, 1999 by Deo, et al. and commonly assigned to the assignee of the present application.

TECHNICAL FIELD

This invention relates to a class of devices commonly known as smart cards and, in particular, to an application development system and method for smart cards.

BACKGROUND OF THE INVENTION

Today there is increasing use of "smart cards" in place of, or in addition to, conventional magnetic stripe cards ("mag cards"). A "smart card" is a thin card embedded with a memory device (volatile and/or non-volatile) and associated programmable or non-programmable logic. Unlike the mag card that merely stores "static" information (e.g., a credit card account number), a smart card can add, delete and otherwise manipulate information stored on the card. Accordingly, smart cards are capable of storing and executing applications to carry out one or more functions within a smart card.

While the physical dimensions and processing features of the smart card give rise to potentially limitless applications, the reality is that smart card applications are only being developed for large scale markets, e.g., banking, security and transportation applications. One reason for this limited growth lies in the cost associated with smart card application development. There are several reasons why smart card application development is a costly undertaking, not the least of which is the "closed" nature of the smart card and the limited processing, memory and input/output resources of the smart card.

A smart card is often referred to as a "closed" system because, for security purposes, a smart card is purposefully designed to not expose its memory, intermediate system states or data and address bus information to external devices. To do so would render it susceptible to unauthorized access (hacking) and fraud. While its closed nature is useful for secure applications such as banking transactions, it makes it difficult to utilize prior art smart cards for development purposes. It is to be appreciated that application development often requires access to memory or bus values, or system state information during intermediate processing steps, access that has been specifically designed out of the smart card.

Another encumbrance to the smart card application designer is the limited resources of the smart card. That is, due to the physical and processing constraints placed on the smart card, prior art smart cards do not enjoy any dedicated debug facilities. Aside from the limited processing and memory attributes of a smart card, a smart card typically has but a single, bi-directional input/output (I/O) port. The communication bandwidth of this single I/O port is typically consumed to support execution of the smart card application itself, leaving little to no communication bandwidth to support debug features. Thus, application development using a smart card itself is virtually impossible. Consequently the development of applications for a smart card currently requires the use of an in-circuit emulator (ICE) and an associated, often proprietary software development application.

An ICE system is typically comprised of a printed circuit card coupled to a computer system executing a proprietary software development application associated with the printed circuit card (emulator). The printed circuit card is designed to emulate the functionality of the smart card, while providing additional debug facilities (e.g., I/O ports, memory buffers, address and data lines and the like), thereby providing the developer with the necessary access to adequately debug their applications in development. One limitation of such smart card development systems is that the ICE and proprietary development application are chip-specific. Thus, an emulator for smart card employing a Siemens processor will not work with an emulator employing a Philips or Motorola processor without significant hardware modification. Moreover, the software development application executing on the computer system is also chip-specific, with an associated chip-specific compiler, linker and debugger, and often require that a developer learn the "programming language" of the development tool. Consequently, an application developed on one ICE system cannot be utilized (or directly ported to) a smart card employing a different processor without costly modification.

These emulators work with special versions of the smart card processors called 'bondouts'—these are the same processors as in the smart card but they expose their memory, data bus, etc to facilitate debugging. Since these special processors behave exactly like the processor in the smart card, many smart card processor manufacturers consider them to be a high risk items that may allow hackers to learn the smart card processor's deficiencies. To prevent this they screen recipients and make them sign restrictive agreements before these bondouts can be supplied. This model of working is totally unsuitable for the large scale acceptance and use by existing PC developer community.

As a result of each of the foregoing limitations, smart card application development is a costly undertaking, typically performed by the large corporations that stand to profit from the sale of millions of smart cards. History has shown that in order for a new technology to blossom, "grass roots" application development is required. That is, a technology will not truly become a pervasive technology unless and until it is infused with the vitality and creativity of individual programmers and small development companies.

Thus, an improved application development environment is required for smart card applications that is unencumbered by the limitations commonly associated with the prior art. One such solution is presented below.

SUMMARY OF THE INVENTION

This invention concerns an integrated circuit (IC) card, such as a smart card and, more particularly, an improved application development system for smart card applications. In accordance with a first aspect of the invention, a smart card includes a smart card development interface (SCDI) to receive remote procedure calls from a computer system to application program interface (API) features of the smart card operating system, to invoke the API called in the received RPC, and to respond to the computer system as appropriate.

According to another aspect of the invention, a computer system includes an innovative client development interface (CDI), to marshal and issue a remote procedure call to an associated API of the operating system of the smart card, and to receive and present a response from the smart card for presentation to a calling application, as appropriate.

It is to be appreciated that combination of the foregoing aspects of the present invention gives rise to a smart card application development system comprising a computer system endowed with the client development interface (CDI), and a smart card incorporating the smart card development interface, wherein the computer system is executing a common development application that issues commands to smart card API's, whereupon the CDI intercepts the remote procedure calls, marshals the parameters associated with the command and issues the command to the smart card. The development interface of the smart card receives and un-marshals the command and invokes an API called by the RPC, marshaling and issuing a response to the computer system as appropriate. A development system incorporating these innovative aspects facilitates smart card development without the need for an ICE system, typical of the prior art. Thus, the present invention represents a new paradigm in smart card application development, enabling entry into the market of individual programmers and small development companies.

BRIEF DESCRIPTION OF THE DRAWINGS

FIG. 4 is a block diagram of an example smart card including a smart card development interface, suitable for use in the smart card application development system of FIG. 1;

FIG. 6 is a graphical illustration of a data structure containing an example proxy library suitable for use in the computer system of FIG. 3;

FIG. 7 is a graphical representation of an example marshaling buffer suitable for use with the present invention;

FIG. 9 is a flow chart of an example method for smart card application development utilizing the innovative smart card application development system depicted in FIG. 1.

DETAILED DESCRIPTION

Example Development System

Figure 1:
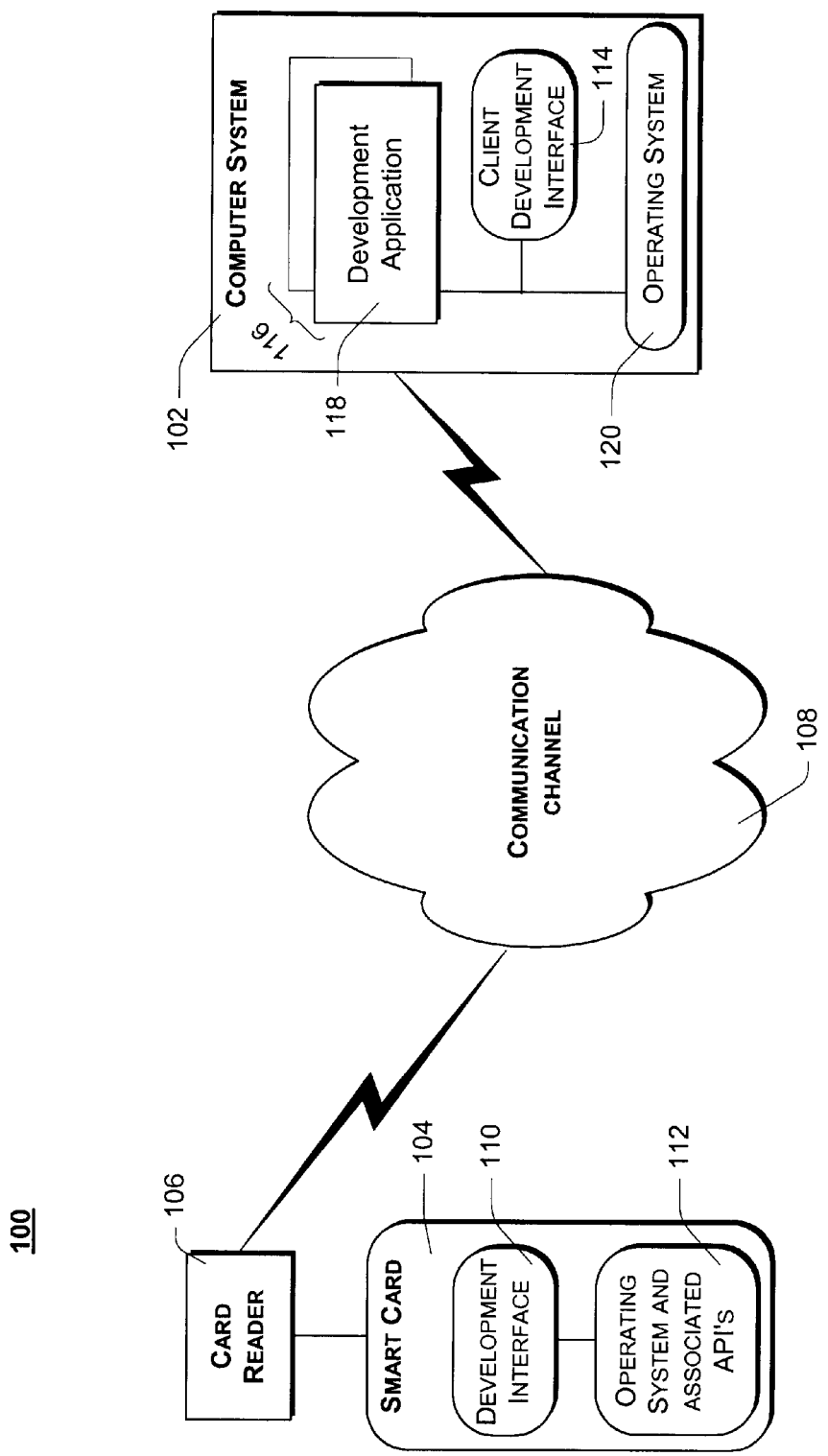
FIG. 1 is a block diagram of an example smart card application development system including a computer system and a smart card.

FIG. 1 illustrates a smart card application development system 100 comprising a computer system 102 employing a generic software development application coupled to a smart card 104. The exemplary development system 100 of FIG. 1 depicts computer system 102 coupled to smart card 104 via a card reader 106 and a communication medium 108. The communication medium 108 is intended to represent any of a number of typical communication links including, but not limited to, a proprietary data bus, an industry standard data bus, a local area network (LAN), a wide area network (WAN), or a global area network (e.g., the Internet). In this regard, the innovative smart card application development system 100 facilitates remote development of smart card applications using an actual smart card 104 coupled to a remote computer system 102 via a communications network 108 and a card reader 106.

According to one aspect of the present invention, smart card 104 comprises a smart card development interface 110 coupled to an operating system (OS) 112 with a set of innovative smart card application program interfaces (APIs). It is to be appreciated that the APIs provide a wide range of functional capability within the smart card, albeit limited to the application area suitable for smart cards. As will be developed in greater detail below, the smart card development interface (SCDI) 110 receives remote procedure calls (RPC) from computer system 102 and selectively invokes APIs associated with operating system 112 enabling smart card 104 to carry out specific functional tasks. In this way, the functionality of innovative smart card 104 is controlled in a step-wise fashion that is conducive to application development. It is to be appreciated that, but for the smart card development interface (SCDI) 110, smart card 104 and its operating system with associated API's 112 is intended to represent any of a broad range of integrated circuit cards and their operating systems commonly known in the art. That is, any smart card endowed with the smart card development interface 110 is suitable for use within the smart card application development system 100 of FIG. 1.

It is noted that, in addition to the illustrated smart cards, the IC card might be embodied in other forms, such as an electronic wallet, a personal digital assistant, a smart diskette (i.e., an IC-based device having a form factor and memory drive interface to enable insertion into a floppy disk drive), a PC card (formerly PCMCIA card), and the like. Generally, the integrated circuit card 104 is characterized as an electronic device with limited processing capabilities and memory wherein large size number crunching is either absent or is provided for specific security purposes (e.g., to execute cryptographic algorithms). For purposes of this discussion and within the context of the illustrated implementation, the terms "IC device", "IC card", and "smart card" will be used interchangeably to reference the smart card 104.

Card reader 106 provides a necessary interface between smart card 104 and a computing system such as, e.g., computer system 102. Card readers are typically designed to support any of a number of standardized communication protocols supported within the smart card community and, in this way, can typically accommodate smart cards adhering to any of the recognized communication standard from any smart card manufacturer. In this regard, card reader 106 is typically not chip- or card-specific although in some cases it may be. For purposes of this discussion, card reader 106 includes the necessary hardware and software resources required to support standardized communication between computer 102 and smart card 104. Consequently, card reader 106 is merely intended to be illustrative of card readers typically known within the art.

Computer system 102 is depicted within FIG. 1 as comprising an innovative client development interface (CDI) 114, a plurality of executable applications 116 including a development application 118, each of which is supported by the resources of a typical operating system 120, as shown. As will be developed in more detail below, the client development interface (CDI) 114 identifies remote procedure calls (RPCs) to smart card 104 resources (e.g., API's), marshals the parameters required by the smart card 104 and issues the RPC to the smart card development interface 110 via communication channel 108 and card reader 106. The smart card 104 receives and executes the called API and returns the result to the calling application via the communication channel 108 and CDI 114, as appropriate. But for the client development interface 114, computer system 102, applications 116 and operating system 120 are each intended to represent any of a number of commonly known computer systems, applications and operating systems, respectively, known in the art.

According to one aspect of the present invention, any of a number of prior art development applications, or tools, may well be used in accordance with the innovative SCDI 110 and CDI 114 of development system 100 to develop smart card applications. Examples of such software development tools include Visual Basic or Visual C/C++ from Microsoft Corporation of Redmond, Wash. Thus, a smart card application is developed using computer 102 and a typical software development tool 118, utilizing smart card API calls within the developed code. The smart card API's are recognized by client development interface 114, described above, which selectively invokes the called resources of the smart card 102.

In this regard, development system 100 comprising an innovative SCDI 110 and a CDI 114 effectively liberates a developer from the costly and cumbersome proprietary development tools commonly associated with the prior art. Rather the present invention facilitates application development using a standard personal computer 102 endowed with typical software development tools and an innovative client development interface 114 can develop smart card applications using smart card 104 endowed with a smart card development interface 110.

Example Computer System

In the discussion herein, the invention is described in the general context of computer-executable instructions, such as program modules, being executed by one or more conventional computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, personal digital assistants, multiprocessor systems, microprocessor-based or programmable consumer electronics, network PCs, minicomputers, mainframe computers, and the like. In a distributed computer environment, program modules may be located in both local and remote memory storage devices.

Figure 2:
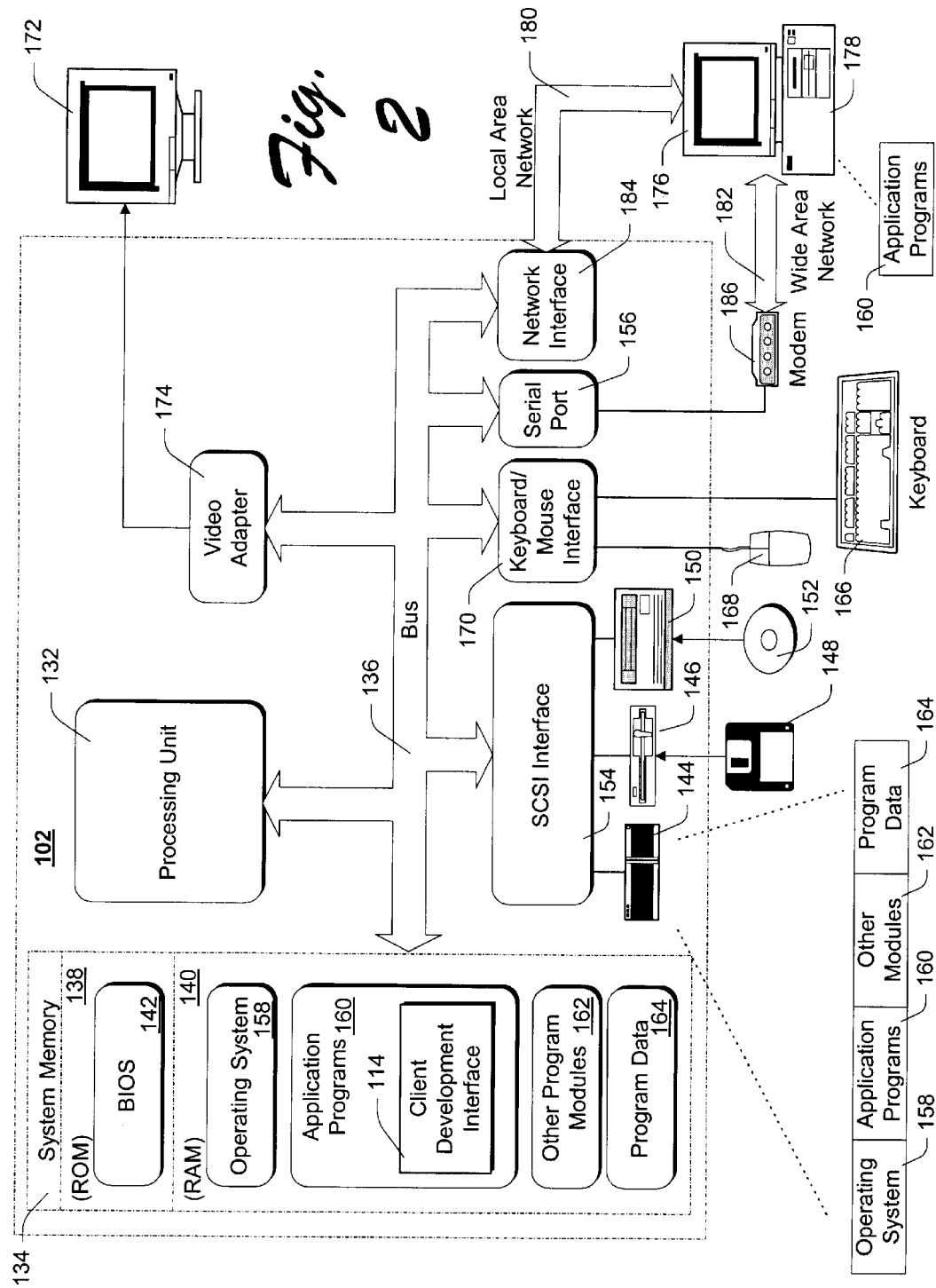
FIG. 2 is a block diagram of an example computer system including an innovative client development interface, suitable for use in the smart card application development system of FIG. 1.

FIG. 2 shows a general example of a computer system 102 incorporating the teachings of one aspect of the present invention, and suitable for use within the smart card application development system 100. It will be evident, from the discussion to follow, that computer 102 is intended to represent any of a class of general or special purpose computing platforms which, when endowed with the innovative client development interface, is suitable for use in smart card application development system 100. In this regard, the following description of computer system 102 is intended to be merely illustrative, as computer systems of greater or lesser capability may well be substituted without deviating from the spirit and scope of the present invention.

As shown, computer 102 includes one or more processors or processing units 132, a system memory 134, and a bus 136 that couples various system components including the system memory 134 to processors 132.

The bus 136 represents one or more of any of several types of bus structures, including a memory bus or memory controller, a peripheral bus, an accelerated graphics port, and a processor or local bus using any of a variety of bus architectures. The system memory includes read only memory (ROM) 138 and random access memory (RAM) 140. A basic input/output system (BIOS) 142, containing the basic routines that help to transfer information between elements within computer 102, such as during start-up, is stored in ROM 138. Computer 102 further includes a hard disk drive 144 for reading from and writing to a hard disk, not shown, a magnetic disk drive 146 for reading from and writing to a removable magnetic disk 148, and an optical disk drive 150 for reading from or writing to a removable optical disk 152 such as a CD ROM, DVD ROM or other such optical media. The hard disk drive 144, magnetic disk drive 146, and optical disk drive 150 are connected to the bus 136 by a SCSI interface 154 or some other suitable bus interface. The drives and their associated computer-readable media provide nonvolatile storage of computer readable instructions, data structures, program modules and other data for computer 102. Although the exemplary environment described herein employs a hard disk 144, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk 144, magnetic disk 148, optical disk 152, ROM 138, or RAM 140, including an operating system 158, one or more application programs 160 including, for example, the innovative client development interface 114, other program modules 162, and program data 164. A user may enter commands and information into computer 102 through input devices such as keyboard 166 and pointing device 168. Other input devices (not shown) may include a microphone, joystick, game pad, satellite dish, scanner, or the like. These and other input devices are connected to the processing unit 132 through an interface 170 that is coupled to bus 136. A monitor 172 or other type of display device is also connected to the bus 136 via an interface, such as a video adapter 174. In addition to the monitor 172, personal computers often include other peripheral output devices (not shown) such as speakers and printers.

As shown, computer 102 operates in a networked environment using logical connections to one or more remote computers, such as a remote computer 176. The remote computer 176 may be another personal computer, a personal digital assistant, a server, a router or other network device, a network "thin-client" PC, a peer device or other common network node, and typically includes many or all of the elements described above relative to computer 102, although only a memory storage device 178 has been illustrated in FIG. 2.

As shown, the logical connections depicted in FIG. 2 include a local area network (LAN) 180 and a wide area network (WAN) 182. Such networking environments are commonplace in offices, enterprise-wide computer networks, intranets, and the Internet. In one embodiment, remote computer 176 executes an Internet Web browser program such as the "Internet Explorer" Web browser manufactured and distributed by Microsoft Corporation of Redmond, Washington to access and utilize online services.

When used in a LAN networking environment, computer 102 is connected to the local network 180 through a network interface or adapter 184. When used in a WAN networking environment, computer 102 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 102, or portions thereof, may be stored in the remote memory storage device. It will be appreciated that the network connections shown are exemplary and other means of establishing a communications link between the computers may be used.

Generally, the data processors of computer 102 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the innovative steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Example Client Development Interface

Figure 3:
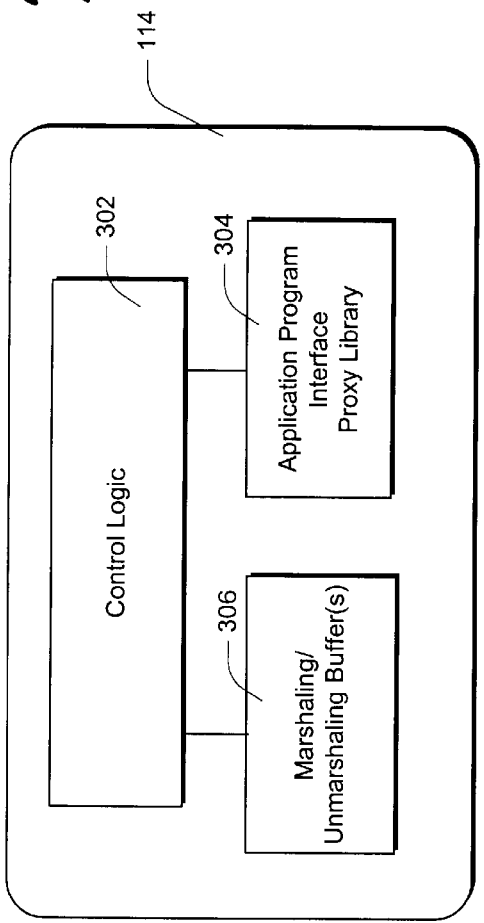
FIG. 3 is a block diagram of an example client development interface suitable for use within the computer system of FIG. 2.

FIG. 3 illustrates a block diagram of an example client development interface 114, suitable for use in computer system 102. As shown, client development interface 114 comprises control logic 302, an application program interface proxy library 304 and one or more marshaling/un-marshaling buffers 306, each coupled as depicted. According to this implementation, client development interface 114 is invoked by a calling application. Thus, in order to utilize the resources of CDI 114 and, more specifically, the proxy library 304, the CDI 114 must be identified within the executing application. In one embodiment, this is done by identifying the resource in the code of the application.

Control logic 302 is intended to represent any of a broad range of logic known in the art. In one implementation, control logic 302 is a processor, while in alternate embodiments control logic is a microcontroller, a programmable logic array, or a series of executable instructions which perform logic functions. Control logic 302 communicates with smart card 104 in any of a plurality of standard smart card communication protocols. In alternate embodiments, non-standard protocols may well be used to communicate between controller 302 and smart card 104 such as, for example, a unique development communication protocol. Although not specifically denoted, it is to be appreciated that controller 302 communicates with smart card 104, and any other peripheral for that matter, via the communication resources of operating system 120. Insofar as such resources are well known in the art, they need not be described further here.

As used herein, "marshaling" means converting a function argument from its binary representation (i.e., compiled application format) into some language independent format, and then converting this generic representation into a binary format appropriate to the called function, (i.e., that of the smart card). Accordingly, the marshaling/unmarshaling buffer(s) 306 are one or more buffers wherein the parameters necessary to issue a complete API call, as defined by the proxy library, are compiled before issuance to the SCDI 110 of the smart card 104. Accordingly, marshaling/un-marshaling buffer(s) 306 are intended to represent any of a number of alternate memory devices commonly known to those in the art.

The application program interface proxy library 304 provides a functional library of smart card application program interfaces available to a calling application. According to one implementation, proxy library 304 contains a detailed listing of all smart card API's, associated function calls and function parameters necessary to invoke the API on smart card 104. As will be developed in more detail below, upon recognizing a call to a smart card API, control logic 302 of CDI 114 accesses proxy library 304 to identify the associated function call and required parameters necessary to properly invoke the function on the smart card 104. Control logic 302 establishes a buffer entry within marshaling/un-marshaling buffer(s) 306 in which to marshal (or compile) the necessary parameters. Once the necessary parameters have been collected (marshaled), control logic 302 issues a command to the smart card 104 via network 108 and card reader 106 using a smart card standard communication protocol such as, for example, International Standards Organisation (ISO) 7816 T=0, or T=1.

Although depicted as a separate functional element, those skilled in the art will appreciate that client development interface 114 may well be integrated within and utilize the control features associated with the software development application 118. In one implementation, for example, control logic 302 and the marshaling/un-marshaling buffer(s) 306 may well be supplied by a debug environment within the application development tool 118, wherein client development interface is comprised solely of proxy library 304. Accordingly, the teachings of the present invention may well be practiced with variation from the exemplary embodiment without deviating from the spirit and scope of the present invention.

Application Program Interface

Those skilled in the art will appreciate that an application program interface, or API, interfaces a (usually) higher-level program such as an application to lower-level services and functions of another application or resource. In this regard, the API provides an "abstraction layer" to the functions and services of another resource. According to one aspect of the present invention, proxy library 304 provides a number of innovative IC card API's that enable a developer to write and test smart card applications on a host computer system (102) using the functional resources of a communicatively coupled IC card (104).

According to this aspect, the application running on the host can use the remote procedure call (RPC) method, introduced above, to access the APIs on the card. The API calls in such programs are identified by control logic 302 of CDI 114 and proxied to SCDI 110 of the IC card 104 via marshaling buffer 306. The API itself is thus executed on the card 104 and the results are sent back to the application executing on computer 102 via SCDI 110, communication channel 108 and CDI 114, respectively. As alluded to above, to utilize CDI 114 and proxy library 304, applications need to include a header file and link to the proxy library. In one implementation, the header file is the "wincard-proxy.h" header file and the scwapi.dll API library. After referencing such files in the header, a call to a smart card resource will be in the form:

SCODE WINAPI API Call (API arguments)  (1)

For purposes of illustration, and not limitation, some example API's are presented in Table I, below, that enable an application executing on a computer system (102) to utilize the functional resources of a communicatively coupled IC card (104), according to the teachings of the present invention. A more complete description of these and additional innovative APIs are provided in Appendix A.

TABLE I

Example IC Card APIs

| Function Call | Description |
| --- | --- |
| ScwAttachToCard | A prerequisite for all other RPC API calls; used to connect with the card and initialize internal data structures that are needed for other API calls. |
| ScwDetachFromCard | Frees the resources of an identified IC card; this API should always be called at the end of an RPC session. |
| ScwCreateFile | Enables an application executing on a computer to open an existing file residing on the IC card, or to create one if it does not already exist. |
| ScwDeleteFile | Enables an application executing on a computer to delete the indicated file, which could be an access-control list (ACL) or a directory. |
| ScwWriteFileByName | Enables an application to write to an IC card file at an indicated offset without having to open the file. |
| ScwReadFileByName | Enables an application to read from an IC card file at an indicated offset without having to open the file. |
| ScwIsAuthenticated | Enables an application to invoke an authentication function on the IC card. |

It will be appreciated that the RPC development environment facilitated by the innovative APIs, SCDI 110 and CDI 114 execute with all of the speed and resources of the host computer, while eliminating the need to "emulate" the smart card resources—an actual smart card is utilized instead.

Example Smart Card

FIG. 4 illustrates a block diagram of an example smart card 104 suitable for use within smart card application development system 100 of FIG. 1. In addition to the innovative smart card development interface (SCDI) 110 and an operating system with associated APIs 112, smart card 104 is shown comprising an input/output interface 402, a plurality of applications 404 including smart card development interface 110, memory 406 and control logic 408. As discussed above, except for the inclusion of innovative smart card development interface (SCDI) 110, to be described more fully below, smart card 104 is intended to represent any of a broad category of integrated circuit (IC) cards commonly known in the art. Thus, but for SCDI 110, each of I/O 402, applications 404, memory 406 and control logic 408 are likewise commonly known within the art and, consequently, will not be further described here.

Figure 5:
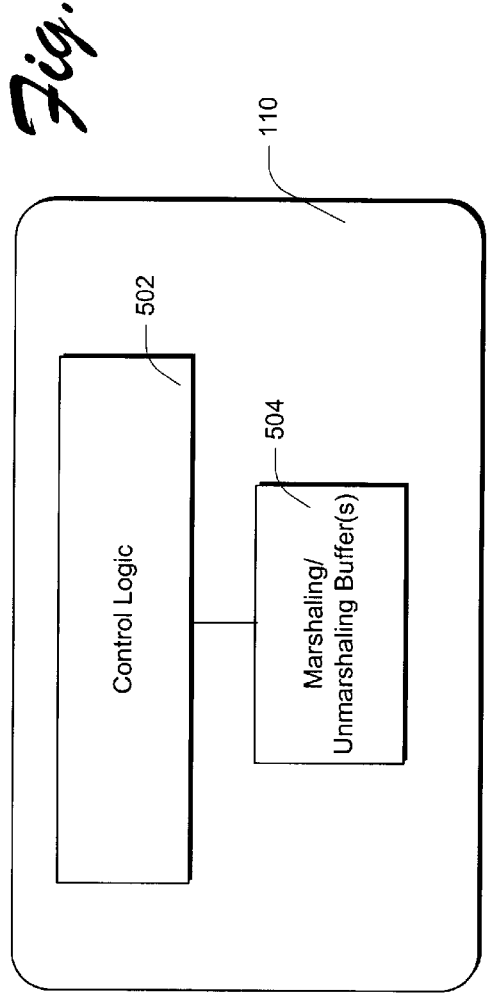
FIG. 5 is a block diagram of an example smart card development interface, suitable for use within the smart card of FIG. 4.

FIG. 5 illustrates a block diagram of an example smart card development interface (SCDI) 110, suitable for use within smart card 104 of application development system 100 in FIG. 1. In accordance with the example implementation of FIG. 5, SCDI 110 is shown comprising control logic 502 and marshaling/un-marshaling buffer(s) 504, coupled as depicted. According to one implementation, SCDI 110 is invoked by CDI 114 upon the initial remote procedure call to smart card 104.

According to this exemplary implementation, control logic 502 may be any of a plurality of logic and logic functions commonly known in the art such as, for example, a processor, a controller, or a plurality of executable instructions which implement such functionality. Control logic 502 receives a function call from CDI 114 via communication channel 108, card reader 106 and smart card I/O 402 according to any of a plurality of communication protocols, described above. In response, control logic 502 invokes the called API, utilizing the parameters received in the marshaled function call. Smart card 104 executes the called API. If a response is called for by the executing API, control logic 502 establishes a buffer entry within marshaling/un-marshaling buffer(s) 504 and, once marshaled, issues the response to the CDI 114 via smart card I/O 402, card reader 106 and communication channel 108. Accordingly, control logic 502 receives and interprets the remote procedure calls from the CDI 114 to selectively invoke called API's of the smart card OS 112, and to return response information to CDI 114 as appropriate.

As described above, SCDI 110 is responsive to the application development interface of an appropriately endowed computer system, e.g., computer 102, to convert the otherwise ordinary smart card 104 into an essential development tool. No longer does a developer have to rely on emulation or simulation of smart card resources, but rather, the SCDI 110 opens the otherwise closed resources of the smart card 104 to the developer.

Example Data Structures

FIG. 6 is a graphical illustration of a data structure containing an example proxy library 600, suitable for use by computer system 102 of development system 100 of FIG. 1. As shown, proxy library 600 contains a list of remote procedure calls 602 corresponding to smart card application program interface (API) function codes 604. In addition, proxy library 600 includes fields for the size 606 of the function call, the number of parameters 608, the parameter type 610 and whether invocation of the function call elicits a response 612.

FIG. 7 is a graphical representation of an example send buffer suitable for use in association with the present invention. As shown, send (or marshalling) buffer 306 provides enough fields to accommodate elemental aspects of a smart card communication protocol. In accordance with the illustrated example embodiment of FIG. 7, marshaling buffer 306 is established by control logic 302 with fields 702 in accordance with the International Standards Organisation standard 7816 (ISO 7816) communication protocol command structure. As described above, the marshaling buffer 306 is populated with information retrieved from proxy library 600.

Figure 8:
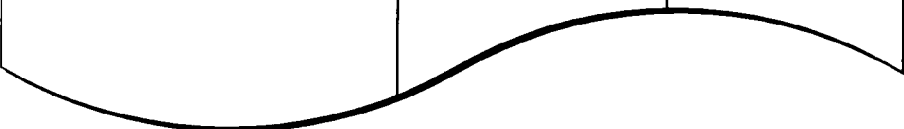
FIG. 8 is a graphical representation of an example unmarshaling buffer suitable for use with the present invention.

FIG. 8 is a graphical illustration of an example response buffer suitable for use in association with the present invention. As shown, response buffer 504 provides enough fields to accommodate the elemental aspects of a smart card communication protocol. In accordance with the illustrated example embodiment of FIG. 8, response buffer 504 is established by control logic 502 to include a data_field, and two status byte fields (SW1, SW2), cumulatively referenced as 802. It is to be appreciated that although proxy library 600 is depicted as a two-dimensional data structure, this is for ease of explanation only. Data structures of greater or lesser complexity are anticipated within the scope of the present invention.

Example Operation

FIG. 9 is a flow chart of an example method for smart card application development utilizing the innovative smart card application development system depicted in FIG. 1. For ease of explanation, and not limitation, the method of FIG. 9 will be developed with continued reference to FIGS. 1–8.

With reference to FIG. 9, the method begins with step 902 wherein a developer writes a smart card application in any of a number of alternative languages and/or common application development tools, specifying a smart card proxy library and embedding remote procedure calls to smart card API's within the code of the application. As described above, the software development application 118 is immaterial, so long as the smart card proxy library is specified within application, CDI 110 will be invoked when the host computer 102 executing the application processes an RPC to a smart card API. In step 904, the application is invoked.

In step 906, the application executes until a remote procedure call (RPC) to an IC card API is encountered. In step 908, upon detecting a smart card RPC, control logic 302 of CDI 114 accesses proxy library 304 to identify the functions and parameters associated with the RPC and establishes a buffer entry within marshaling buffer 306 to compile the required parameters. The control logic 302 prepares the buffer entry (also referred to as the send buffer) in marshaling buffer 306. To further explain this point, consider the example API call and the example proxy library of FIG. 6.

As described above, the information contained in the proxy library 600 enables CDI 106 to create a marshaling (or, send) buffer (306) to generate the API call to the smart card. In accordance with the illustrated example of FIG. 6, the ScwIsAuthenticated remote procedure call 614 is depicted, with associated information in corresponding fields 604–612. Accordingly, upon receiving the ScwIsAuthenticated RPC 614, CDI 106 creates a marshaling buffer 306 according to the information retrieved from the proxy library 600 to marshal the information required for transmission to the smart card. An example of the send buffer for the ScwIsAuthenticated is illustrated with reference to FIG. 7. It is to be appreciated that different RPC's of greater or lesser complexity may have associated send-buffers with a corresponding greater or lesser complexity. Appendix A includes a listing of innovative remote procedure calls and their associated send-buffer's, according to one aspect of the present invention.

In step 910, the completed send-buffer is sent to smart card 104 via communication channel 108 and card reader 106, and CDI 114 awaits a response from the smart card, as appropriate. In step 912, control logic 502 of smart card development interface 10 receives the send buffer via I/O port 402 and invokes a corresponding application program interface (API), establishing a response buffer in buffer(s) 504, as appropriate. In step 914, upon completion of the API command at smart card 104, control logic 502 of smart card development interface 110 marshals response parameters in response buffer 504, according to definition of the called API, and sends the response buffer to the CDI 114 via I/O port 402, card reader 106 and communication channel 108. In accordance with the illustrated example embodiment, an example response buffer 504 is graphically illustrated with reference to FIG. 8. As above, the response buffer of FIG. 8 is for illustrative purposes, as response buffers of greater or lesser complexity corresponding with API's of greater or lesser complexity are anticipated within the scope of the present invention.

In step 916, upon receiving a response buffer from SCDI 110, control logic 302 of CDI 114 promotes the response to the calling application 118.

It is to be appreciated that the innovative smart card development interface 110 transforms the otherwise closed system of smart card 104 into an application development tool. Moreover, the client development interface 114 transforms a common application development tool such as Microsoft's Visual BASIC, or Visual C/C++ into a smart card application development tool. Accordingly, the combination of the smart card development interface 110 and the client development interface 114 enable a developer to enter the smart card development market with minimal cost, thereby facilitating the development of applications for limited-sized markets and promoting the growth of the smart card industry.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

APPENDIX A

EXAMPLE API SET

⑨ ScwAttachToCard/hScwAttachToCard: This is a RPC (Proxy) API only. It is a prerequisite for all other RPC API calls. It is used to connect with the card and initialize internal data structures (e.g. card handle) that are needed for the other RPC API calls.

⑨ ScwAttachToCardEx: This is a RPC (Proxy) API only. This is an extension to ScwAttachToCard allowing you to specify which ISO 7816-3 INS is used by the RPC APDUs.

⑨ ScwAuthenticateName: This function is used to authenticate a Known Principal (KP). The KP is identified by a Unicode string.

⑨ ScwAuthenticateUID: This function is used to authenticate a Known Principal (KP). The KP is identified by its unique ID (UID).

⑨ ScwCloseFile: This function closes the file identified by the file handle.

⑨ ScwCreateDirectory: This function creates a directory with the given ACL file.

⑨ ScwCreateFile: This function opens an existing file or creates a new one if it doesn't exist.

⑨ ScwCryptoAction: This function provides data to the currently active cryptographic mechanism and obtains the final output.

⑨ ScwCryptoFinalize: This function returns the final result of the current cryptographic process. It always follows a sequence of calls to ScwCryptoUpdate.

⑨ ScwCryptoInitialize: This function sets up a cryptographic mechanism for processing, provided that the requester is authorized to use the mechanism.

⑨ ScwCryptoUpdate: This function feeds more data for processing a cryptography mechanism that is currently active.

⑨ ScwDeauthenticateName: This function deauthenticates the given known principal.

⑨ ScwDeauthenticateUID: This function deauthenticates the given known principal.

⑨ ScwDeleteFile: This function deletes the indicated file, which could be an access-control list (ACL) file or a directory.

⑨ ScwDetachFromCard: This is a RPC (Proxy) API only. Frees the resouces associated with the RPC card handle.

⑨ ScwEnumFile: This function enumerates a directory, returning file names one at a time.

⑨ ScwExecute: This function executes command associated with the given INS value on the card.

⑨ ScwGenerateRandom: This function generates pseudo random numbers in the given buffer.

APPENDIX A-continued

EXAMPLE API SET

⑨ ScwGetComm: This function gets data from the host. Use with VB only.
⑨ ScwGetCommByte: This function gets one byte from the host. Use with VB only.
⑨ ScwGetCommBytes: This subroutine reads in bytes from the input stream send by the host application and places those bytes into a Byte array in your VB program. You can specify all or part of the Byte array to be filled. Use with VB only.
⑨ ScwGetCommInteger: This function gets one byte from the host. Use with VB only.
⑨ ScwGetCommLong: This function gets a Long value from the host. Use with VB only.
⑨ ScwGetFileAclHandle: This function opens the associated ACL file for a given file.
⑨ ScwGetFileAttributes: This function returns the file attribute value associated with the given file.
⑨ ScwGetFileLength: This function returns the file size.
⑨ ScwGetPrincipalUID: This function searches for the given known principal in the card's list of known principals and, if found, returns its UID.
⑨ ScwGetTimer: This function gets the current value of the timer.
⑨ ScwIsAuthenticatedName: This function indicates a known principal's current authentication status.
⑨ ScwIsAuthenticatedUID: This function indicates a known principal's current authentication status.
⑨ ScwIsAuthorized: This function indicates if a requested operation is authorized in the current state of the card (based on the set of KPs currently authenticated.)
⑨ ScwReadFile: This function reads the indicated number of bytes at the current offset.
⑨ ScwReadFileByName: This function reads the indicated number of bytes at the indicated offset. Available in Proxy only.
⑨ ScwSendComm: This function sends data to the host application using the standard input/output channels.
⑨ ScwSendCommByte: This function sends one byte to the host.
⑨ ScwSendCommBytes: This subroutine reads data from a byte array in a Visual Basic program. It then sends those bytes to host application on the output stream. You can specify all or part of the byte array to be sent.
⑨ ScwSendCommInteger: This function sends one Integer (2 bytes) to the host. Use with VB only.
⑨ ScwSendCommLong: This function sends one Long to the host. Use with VB only.
⑨ ScwSetDispatchTable: Makes the given file as the current dispatch table file. The card will revert to the original dispatch table file after the reset. To make the change permanent, you need to do modify the default dispatch table file ("/dt").
⑨ ScwSetFileACL: This function sets the ACL file for the given file. Public Declare Function ScwSetFileACL Lib "SYS" (ByVal FileName As String, ByVal ACLFileName As String) As Byte
⑨ ScwSetFileAttributes: This function sets the file attribute value associated with a given file.
⑨ ScwSetFileLength: This function changes the file size.
⑨ ScwSetFilePointer: This function changes the current offset of the file to the indicated offset.
⑨ ScwSetTransmitCallback: This API is used by applications providing their own transport layer. This is a RPC (Proxy) API only.
⑨ ScwStartTimer: ScwStartTimer and ScwGetTimer are provided so that developers can obtain timing information about their Smart Card applications. Calling ScwStartTimer will reset the internal timer to zero. Calling ScwGetTimer returns the current value of the timer.
⑨ ScwWriteFile: This function writes the indicated number of bytes at the current offset.
⑨ ScwWriteFileByName: This function writes the indicated number of bytes at the indicated offset. Available in Proxy only.

What is claimed is:

1. An integrated circuit (IC) card comprising:
an input/output (I/O) interface; and
a smart card development interface, responsive to commands received via the I/O interface, to receive remote procedure calls (RPC) from a computer system executing an application under development within a development application and to invoke an application program interface (API) called in the RPC, the smart card development interface additionally comprising:
a memory having stored therein a plurality of executable instructions;
control logic, coupled to the memory, to execute the plurality of executable instructions to implement the smart card development interface, wherein the smart card development interface receives and un-marshals the remote procedure call (RPC) from the computer system and invokes one of a plurality of application program interface(s) (API) corresponding to the received RPC; and
wherein the control logic establishes a response buffer in an associated memory and marshals a response to the RPC based, at least in part, on the called API.

2. An IC card according to claim 1, wherein the control logic receives the RPC from the computer system via a removably coupled IC card interface, responsive to the computer system.

3. An IC card according to claim 1, further comprising a storage medium having stored thereon a plurality of executable instructions which, when executed, implement the smart card development interface.

4. An IC card according to claim 1, wherein the called API's are standard API's of an operating system on the IC card.

5. An IC card according to claim 1, wherein the called API's are special development API's of an operating system on the IC card invoked only from the computer system executing the development application.

6. An IC card according to claim 1, wherein the IC card receives the RPC according to any of a plurality of IC card communication standards.

7. An IC card according to claim 1, wherein the IC card posts a response to the RPC in one of a plurality of IC card communication standards corresponding to a standard in which the RPC was received.

8. An IC card according to claim 1, wherein the IC card receives RPC's from any of a number of remote computers communicatively coupled to the remote computers via a removably coupled IC card interface and a communication network.

9. A smart card application development system comprising:
a computer system having a smart card application development tool stored the computer system additionally comprising a client development interface, to receive and identify the smart card API associated with a particular RPC;
wherein the client development interface including a proxy library with information regarding each of a plurality of API calls, including a number and type of parameters required to make the API call; and
a smart card, responsive to the computer system, comprising a smart card development interface to receive remote procedure call(s) (RPC) to application program interface(s) (API) associated with the smart card operating system from the smart card application development tool.

10. A smart card according to claim 9, wherein the client development interface receives an RPC and marshals the parameters identified in the proxy library before issuing the API call identified within the RPC.

11. A smart card according to claim 9, wherein the client development interface identifies an API associated with an RPC call and issues the API call to the smart card.

12. A smart card development system according to claim 11, wherein the client development interface issues the API call to the smart card via a communication channel and a smart card interface according to any of a plurality of standard smart card communication protocols.

13. A smart card development system according to claim 9, wherein the smart card development interface is configured to receive API calls from the computer system and to invoke called APIs.

14. A smart card development system according to claim 13, wherein the smart card development interface marshals response parameters to issue to the computer system, depending on a definition of the called API.

15. A smart card development system according to claim 13, wherein the smart card development interface issues a response to the computer system in a select one of a plurality of standard smart card communication protocols corresponding to the smart card communication protocol in which the API call was received.

16. A smart card development system according to claim 9, wherein the smart card application development tool is a common software development application.

17. A method for developing smart card applications comprising:

coupling a computer having stored thereon an application development tool to a card reader with a removably coupled smart card;

executing an application on the computer within the application development tool until a remote procedure call (RPC) to a smart card application program interface (API) is encountered within the application;

assembling necessary parameters to issue a call to the API identified in the RPC including (marshaling necessary parameters for the called API, as defined within a proxy library, in a send buffer; and calling the API at the smart card via the card reader.

18. A method for developing smart card applications according to claim 17, wherein the application development tool is a common software development application.

19. A method for developing smart card applications according to claim 17, further comprising accessing a proxy library within the computer system, the proxy library including information regarding each of a plurality of smart card APIs including a number and type of necessary parameters required to invoke each of the smart card APIs.

20. A method for developing smart card applications according to claim 17, further comprising issuing the send buffer to the smart card when all necessary parameters have been marshaled.

21. A method for developing smart card applications according to claim 20, further comprising invoking the called API at the smart card upon receipt of the send buffer.

22. A method for developing smart card applications according to claim 21, further comprising assembling a response buffer at the smart card within which to marshal response parameters for the called API.

23. A method for developing smart card applications according to claim 22, wherein the smart card issues a response to the called API which, when received by the computer system is posted to the executing application.

24. A proxy library comprising:

a plurality of fields containing information regarding a number of smart card application program interfaces (API), wherein the proxy library provides a parameter definition of a smart card application program interface (API) when accessed by control logic upon receiving a remote procedure call (RPC) from an application executing on a computer system, the proxy library enabling the application executing on the computer system to utilize resources of a coupled smart card without having to download the application to the coupled smart card.

25. A proxy library according to claim 24, wherein the proxy library is located on a storage medium within the computer system.

26. A proxy library according to claim 24, wherein the proxy library is accessible by a plurality of computers through a communication network.

27. A method for developing smart card applications comprising:

coupling a computer having stored thereon an application development tool to a card reader with a removably coupled smart card;

executing an application on the computer within the application development tool until a remote procedure call (RPC) to a smart card application program interface (API) is encountered within the application;

assembling necessary parameters to issue a call to the API identified in the RPC and calling the API at the smart card via the card reader; and accessing a proxy library within the computer system, the proxy library including information regarding each of a plurality of smart card APIs including a number and type of necessary parameters required to invoke each of the smart card APIs.

28. A method for developing smart card applications according to claim 27, wherein the assembling necessary parameters includes marshaling necessary parameters for the called API, as defined within a proxy library, in a send buffer.

29. A method for developing smart card applications according to claim 28, further comprising issuing the send buffer to the smart card when all necessary parameters have been marshaled.

30. A method for developing smart card applications according to claim 29, further comprising invoking the called API at the smart card upon receipt of the send buffer.

31. A method for developing smart card applications according to claim 30, further comprising assembling a response buffer at the smart card within which to marshal response parameters for the called API.

32. A method for developing smart card applications according to claim 31, wherein the smart card issues a response to the called API which, when received by the computer system is posted to the executing application.

* * * * *

UNITED STATES PATENT AND TRADEMARK OFFICE
CERTIFICATE OF CORRECTION

PATENT NO. : 6,547,150 B1
DATED : April 15, 2003
INVENTOR(S) : Deo et al.

It is certified that error appears in the above-identified patent and that said Letters Patent is hereby corrected as shown below:

Column 11,
Line 57, replace "10" with -- 110 --.

Signed and Sealed this

First Day of July, 2003

JAMES E. ROGAN
*Director of the United States Patent and Trademark Office*